United States Patent Office

3,231,509
Patented Jan. 25, 1966

3,231,509
SLIMICIDAL COMPOSITION AND METHOD
Bernard F. Shema, Glenside, Pa., assignor to Betz Laboratories, Inc., Philadelphia, Pa., a corporation of Pennsylvania
No Drawing. Filed June 11, 1964, Ser. No. 374,296
7 Claims. (Cl. 252—177)

This application is a continuation-in-part of application Serial No. 195,978, filed May 18, 1962, for Slimicidal Compositions, now abandoned.

The present invention relates to certain processes and compositions useful for inhibiting the growth of slime in water employed for industrial purposes, particularly water employed in the manufacture of paper, as well as other industrial waters. The novel processes and compositions of the present invention are processes or mixtures which show unexpected synergistic activity against microorganisms, including bacteria, fungi and algae, which produce slime in industrial waters.

The novel processes or compositions of the present invention are processes or mixtures employing from 10 to 90% by weight of bis-(trichloromethyl)-sulfone or bis-(tribromomethyl)-sulfone and from 10 to 90% by weight of a quaternary ammonium cationic detergent. When the two ingredients are mixed in the stated amounts, the resulting mixtures possess a high degree of slimicidal activity which could not have been predicted beforehand from the known activity of the individual ingredients comprising the mixture. By means of the present invention, it is therefore possible to produce a more effective slime-control agent than has previously been available. It is a particular advantage of the present invention that the compositions may be made more economically than slimicides generally used in industry.

Bis-(trichloromethyl)-sulfone (also called N-1386) is a known compound, and its preparation has previously been described in the literature. See U.S. Patents 2,959,-517 and 2,628,982. Bis-(tribromomethyl)-sulfone, also called N-4148, is a known compound and its preparation has been described in the literature. See U.S. Patent 3,051,757. The quaternary ammonium cationic detergents are also known compounds which are also described in the literature. As examples there may be mentioned N-long chain alkyl ($C_{12}$–40%, $C_{14}$–50%, $C_{16}$–10%) dimethyl benzyl ammonium chloride (commercially available under the trademark Hyamine 3500), dodecyl - (methylbenzyl) - trimethyl ammonium chloride (available commercially under the trademark Hyamine 2389), and benzyl dimethyl-2-[2-p-1,1,3,3-tetramethylbutyl]phenoxy) ethyl ammonium chloride (available commercially as Hyamine 1622).

It will be evident that the quaternary ammonium cationic detergent may for convenience be indicated as follows:

$$\left[ \begin{matrix} R \\ R^2-N-R^1 \\ R' \end{matrix} \right]^+ X^-$$

where

R is an alkyl group of a carbon chain length between 8 and 30 carbon atoms and preferably between 12 and 24 carbon atoms. The alkyl group may be saturated, or it may be unsaturated, in which case it would be designated alkenyl. Hydrogen atoms on the carbon chain of R can be replaced by any one of the halogens, any alkyl group up to 30 carbon atoms in length, any alkenyl group up to 30 carbon atoms in length, by any alkoxy group such as methoxy, ethoxy, isopropoxy, propoxy or butoxy, or by phenoxy or by hydroxyl.

$R^1$ may be methyl or ethyl.
$R^2$ will be benzyl or naphthyl. In either case there is a $CH_2$ connecting the ring to the nitrogen. Hydrogen atoms on the ring can be replaced as desired by any one of the halogens, by an alkyl group up to 30 carbon atoms in length, by an alkenyl group up to 30 carbon atoms in length, by an alkoxy group such methoxy, ethoxy, isopropoxy, propoxy, or butoxy, by a phenoxy group or by a hydroxyl group.

X may be any acid radical of an inorganic acid or of an organic acid which dissociates similarly, typical examples for X being chlorine, bromine, iodine, sulphate, nitrate, phosphate, acetate, lactate or benzoate.

EXAMPLES

The synergism of the compositions of the present invention is shown in Table I below. These tests were made in the laboratory with an agar substrate procedure. This procedure in these examples consists of adding the material under test to a nutrient substrate in the amount to give the desired concentration in parts per million. The medium used for the bacteria (*Aerobacter aerogenes* and *Bacillus mycoides*) is nutrient agar, and for the fungi (*Aspergillus niger* and *Penecillium expansum*) it is 2% malt agar. The inhibiting concentration is that concentration which does not support the growth of the test organisms. The values expressed in Table I are obtained by calculating a value from the inhibiting concentrations. The data show the existence of synergism to a marked degree in most cases. The values reported are the sums of the ratio $Q_A \div Q_a$ and $Q_B \div Q_b$. $Q_A$ and $Q_B$ are the quantities of material A and material B used in the mixture, and $Q_a$ and $Q_b$ are the minimum inhibitory concentrations of materials A and B respectively. When the sum of this value is less than 1, synergism exists. When the sum of this value is 1, the effect is the same as the toxic effect of each of the components of the mixture and there is no synergism. When the sum of the ratio is greater than 1, the compounds are not compatible (one detracts from the effect of the other) and there is no synergism. As may be seen by inspection of Table I, all of the compounds of the present invention produce a synergistic effect against most of the test organisms.

Table 1

SYNERGISM SUMMARY OF VARYING PERCENTAGES OF N-1386 AND N-4188, COMBINATION AS SHOWN IN TEST ORGANISMS

| Nature of Hyamine | 75% Sulfone 25% Hyamine | | 50% Sulfone 50% Hyamine | | 25% Sulfone 75% Hyamine | |
|---|---|---|---|---|---|---|
| | N-1386 | N-4188 | N-1386 | N-4188 | N-1386 | N-4188 |
| *Aerobacter aerogenes* | | | | | | |
| Hyamine 3500 | 0.50 | 0.34 | 0.50 | 0.56 | 0.50 | 0.77 |
| Hyamine 2389 | 0.85 | 0.89 | 0.57 | 0.62 | 0.68 | 1.22 |
| *Bacillus mycoides* | | | | | | |
| Hyamine 3500 | 0.47 | 0.64 | 0.53 | 0.66 | 1.18 | 0.77 |
| Hyamine 2389 | 0.95 | 1.35 | 0.84 | 1.40 | 0.93 | 1.37 |
| *Penicillium expansum* | | | | | | |
| Hyamine 3500 | 0.38 | -------- | 0.52 | -------- | 0.56 | -------- |
| Hymaine 2389 | 1.00 | -------- | 1.01 | -------- | 0.85 | -------- |
| *Aspergillus niger* | | | | | | |
| Hyamine 3500 | 0.94 | -------- | 0.76 | -------- | 0.66 | -------- |
| Hyamine 2389 | 1.00 | -------- | 0.68 | -------- | 0.69 | -------- |

It will be evident that any slimicide of the character of the present invention functions against a broad spectrum of bacteria, fungi and algae, and is not effective or equally effective against all, but gains its advantage by killing numerous types of bacteria, fungi or algae and especially types which are difficult to kill with other agents. Thus, in a particular case where a particular slimicide will kill bacteria, fungi or algae which are difficult to kill, it can be used in accompaniment with another agent or other agents if necessary. In the case of Table I, *A. aerogenes* is relatively very difficult to kill whereas *B. mycoides* is relatively sensitive to slimicides.

Tests have been made in paper making plants using the composition of the invention as a slimicide in water which is employed in making up a paper furnish. As indicated in Table II below, outstandingly good slimicidal action was obtained. The contact time was six (6) hours.

In Table II, Sample No. 1 consists of 3,5-dimethyltetrahydro - 1,3,5,2H - thiadiazine -2- thione plus 2-mercaptobenzothiazole in a proportion of active ingredients of 27% by weight.

Sample No. 2 has an active ingredient sodium pentachlorophenate and sodium 2,4,5-trichlorophenate and sodium dimethyldithiocarbamate in a total proportion of active ingredient of 45.6%.

Sample No. 3 embodies 85.0% of acrolein.

Sample No. 4 involves the preferred composition of the present invention with 35% by weight of active ingredient.

Sample No. 5 consists of 12.7% by weight of cyanodimethyldithiocarbonate, 4.8% by weight of ethylenediamine and 17.5% of N-methyldithiocarbamate.

Sample No. 6 embodies 14.3% of 3,5-dimethyltetrahydro-1,3,5,2H-thiadiazine-2-thione.

*Table II*

| Cons. (p.p.m.) | Percent kill | | | | | |
|---|---|---|---|---|---|---|
| | Sample No. 1 | Sample No. 2 | Sample No. 3 | Sample No. 4 | Sample No. 5 | Sample No. 6 |
| 5 | | | | 51.5 | | |
| 10 | | | | 67.8 | 96.1 | |
| 25 | +10.0 | 96.7 | 99.9 | 99.3 | 3.5 | +51.0 |
| 50 | 56.4 | 99.8 | 99.9 | 99.9 | 49.9 | 16.0 |
| 100 | 76.5 | 99.9 | 99.9 | 99.9 | 68.4 | 70.6 |
| 150 | | 99.9 | | | | |
| 200 | 83.6 | 99.9 | | 99.9 | 70.6 | 84.7 |
| 300 | 95.0 | | | | 92.5 | 90.4 |

The table gives concentrations in the left hand column and then gives percent kills for the different samples which were tested.

The concentrations in the above table are concentrations of the solution being added, not concentrations of active ingredient.

Considering them for their bearing on the matter of percentage kill for a given concentration of active ingredient, it will be evident that the material as tested in Sample No. 4 shows higher percentage kills at lower concentrations of active ingredient considering the broad spectrum results.

The case of Sample No. 1 and Sample No. 6 where plus values are given represent increase in growth rather than kills.

While the values of Table II were specifically obtained in a particular test for a particular papermill, they are typical of results obtained using the composition of the invention in the preferred admixture of four parts by weight of N–1386 and three parts by weight of Hyamine 3500 in various other plants which present slime problems of the same or greater order of magnitude.

Table III, also showing the results of contact times of six (6) hours, gives a comparison of biological activity of bis-(trichloromethyl)-sulfone and bis-(tribromomethyl)-sulfone in papermill white water under the conditions used in obtaining the data in Table II. This shows that bis-(trichloromethyl)-sulfone and bis-(tribromomethyl)-sulfone both give outstandingly good slimicidal action in papermill white water.

*Table III*

| Concentration in p.p.m. | Chemical | |
|---|---|---|
| | Bis-(trichloromethyl)-sulfone, percent kill | Bis-(tribromomethyl)-sulfone percent kill |
| 2 | +60.0 | +175 |
| 5 | 50.0 | 79.6 |
| 10 | 90.8 | 99.6 |
| 20 | 99.8 | 99.9 |
| 40 | 99.9 | 99.9 |

Table IV shows the relative toxicities of bis-(trichloromethyl)-sulfone and bis-(tribromomethyl)-sulfone for four different test organisms as compared with competitive products such as pentachlorophenate; 3,5-dimethyltetrahydro - 3,5,2H - thiadiazine - 2 - thione plus 2-mercaptobenzo-thiazole 27% by weight; and 12.7% by weight of cyano dimethyldithio carbonate 4.8% of ethylene diamine and 17.5% of N-methyldithiocarbamate. This shows that under the particular tests bis-(trichloromethyl)-sulfone was somewhat more active than bis-(tribromomethyl)-sulfone but that both were more active than any of the competitive materials.

*Table IV*

TEST ORGANISMS

| Chemicals | Inhibiting concentrations in p.p.m. | | | |
|---|---|---|---|---|
| | Aerobacter aerogenes | Bacillus mycoides | Pencillium expansum | Aspergillus niger |
| Bis-(trichloromethyl)-sulfone | 15 | 6 | 20 | 20 |
| Bis-(tribromomethyl)-sulfone | 70 | 30 | 50 | 60 |
| Pentachlorophenate | 225 | 4 | 30 | 35 |
| 3,5-dimethyltetrahydro-1,3,5,2H-thiadiazine-2-thione plus 2-mercaptobenzothiazole 27% by weight | 350 | 45 | 300 | 400 |
| 12.7% by weight of cyano-dimethyldithio carbonate, 4.8% of ethylene diamine and 17.5% of N-methyl-dithiocarbamate | 950 | 30 | 300 | 1,500 |

Feed rates in the preferred embodiment will vary from 1/16 of a pound to 3 pounds of solution to 1 ton of paper furnished produced. For good results the preferred feed has usually been 1/4 of a pound of solution per ton of paper. It will of course be evident that with lower slime loads, the lower feeds of slimicide, for example of the order of 1/8 of a pound of solution per ton of paper, will suitably be used.

It will be understood that generally the range of feed of the composition of the invention will be from 1/10 of a part of solution per million to 50 parts of solution per million, preferably from 1/10 part of solution per million to 10 parts of solution per million.

It will be evident that the composition and method of the invention will be used in various slime-control applications, including cooling water, paper stock, water flooding (secondary oil recovery), reservoirs where the water is not being used for drinking (where, for example, it may be used to control algae) and chemical engineering processing which uses water solutions.

It will be evident that the quaternary ammonium cationic detergent besides effecting a synergistic action as a biocide, also exerts a dispersing action on the bis-(trichloromethyl)-sulfone or bis-(tribromomethyl)-sulfone, greatly facilitating feed. The composition of the invention can be fed directly into the industrial water as the concentrated mixture, or it can be fed with any additional compatible diluent or compatible bodying agent or as a water or other solution.

The preferred composition with four parts by weight of bis-(trichloromethyl)-sulfone and three parts of Hyamine 3500 has been effectively employed in 26 paper machines in 12 different paper companies located in the United States and Canada.

In view of my invention and disclosure, variations and modifications to meet individual whim or particular need will doubtless become evident to other skilled in the art, to obtain all or part of the benefits of my invention without copying the method and apparatus shown, and I, therefore, claim all such insofar as they fall within the reasonable spirit and scope of my claims.

Having thus described my invention, what I claim as new and desire to secure by Letters Patent is:

1. As a novel composition of matter, a mixture of from 10 to 90 percent by weight of a compound of the class consisting of bis-(trichloromethyl)-sulfone and bis-(tribromomethyl)-sulfone, and from 90 to 10 percent by weight of N-alkyl dimethyl benzyl ammonium chloride in which said alkyl has a carbon chain length of between $C_8$ and $C_{30}$.

2. As a novel composition of matter, a mixture of from 10 to 90 percent by weight of a compound of the class consisting of bis-(trichloromethyl)-sulfone and bis-(tribromomethyl)-sulfone and from 90 to 10 percent by weight of dodecyl-(methylbenzyl)-trimethyl ammonium chloride.

3. As a novel composition of matter, a mixture of from 10 to 90 percent by weight of bis-(trichloromethyl)-sulfone and from 90 to 10 percent by weight of N-alkyl dimethyl benzyl ammonium chloride in which said alkyl has a carbon chain length of between $C_8$ to $C_{30}$.

4. As a novel composition of matter, a mixture of from 10 to 90 percent by weight of bis-(tribromomethyl)-sulfone and from 90 to 10 percent by weight of N-alkyl dimethyl benzyl ammonium chloride in which said alkyl has a carbon chain length of between $C_8$ to $C_{30}$.

5. A method of control of slime in an industrial water, which comprises conjointly adding to the water from 10 to 90 percent by weight of a compound of the class consisting of bis-(tribromomethyl)-sulfone and bis-(trichloromethyl)-sulfone, and from 90 ot 10 percent by weight of the solid ingredients of N-alkyl dimethyl benzyl ammonium chloride in which said alkyl has a carbon chain length of between $C_8$ to $C_{30}$, with a total feed of the solid ingredients of between 0.1 and 50 p.p.m.

6. A method of control of slime in an industrial water, which comprises conjointly adding to the water from 10 to 90 percent by weight of a compound of the class consisting of bis-(trichloromethyl)-sulfone and bis-(tribromomethyl)-sulfone and from 90 to 10 percent by weight of the solid ingredients of dodecyl (methylbenzyl)-trimethyl ammonium chloride with a total feed of the solid ingredients of between 0.1 and 50 p.p.m.

7. The method of claim 6, in which about 4 parts by weight of bis-(trichloromethyl)-sulfone are employed with about 3 parts by weight of said ammonium chloride.

References Cited by the Examiner
UNITED STATES PATENTS 2,692,231  10/1954  Stayner et al. _____ 210—62
2,959,517  11/1960  Bowers et al. _____ 167—22

JULIUS GREENWALD, *Primary Examiner.*